United States Patent
Roberts et al.

(10) Patent No.: US 10,086,933 B2
(45) Date of Patent: Oct. 2, 2018

(54) REDUNDANT AIRCRAFT PROPULSION SYSTEM USING MULTIPLE MOTORS PER DRIVE SHAFT

(71) Applicant: Amazon Technologies, Inc., Seattle, WA (US)

(72) Inventors: Nicholas Hampel Roberts, Seattle, WA (US); Dominic Timothy Shiosaki, Seattle, WA (US); Ricky Dean Welsh, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 14/973,618

(22) Filed: Dec. 17, 2015

(65) Prior Publication Data

US 2017/0174337 A1 Jun. 22, 2017

(51) Int. Cl.
*B64C 27/14* (2006.01)
*B64C 27/46* (2006.01)
(Continued)

(52) U.S. Cl.
CPC .............. *B64C 27/14* (2013.01); *B64C 11/18* (2013.01); *B64C 11/48* (2013.01); *B64C 27/46* (2013.01); *B64C 39/024* (2013.01); *B64D 27/26* (2013.01); *B64C 2201/024* (2013.01); *B64C 2201/027* (2013.01); *B64C 2201/042* (2013.01);
(Continued)

(58) Field of Classification Search
CPC ......... B64C 11/48; B64C 11/50; B64C 11/18; B64C 11/30; B64C 27/10; B64C 27/463
See application file for complete search history.

(56) References Cited

U.S. PATENT DOCUMENTS 1,888,681 A    11/1932   Lauszat
1,936,542 A * 11/1933   Nardone ................ F16D 41/00
                                                              192/48.6
(Continued)

FOREIGN PATENT DOCUMENTS

DE           2922516       12/1980
DE     102006056356       6/2008
(Continued)

OTHER PUBLICATIONS

The PCT Search Report dated Mar. 14, 2017 for PCT application No. PCT/US2016/067005, 17 pages.
(Continued)

*Primary Examiner* — Woody Lee, Jr.
*Assistant Examiner* — Juan G Flores
(74) *Attorney, Agent, or Firm* — Lee & Hayes, PLLC

(57) ABSTRACT

Multiple motors may drive (rotate) a single shaft coupled to a propeller. The motors may be selected such that a first motor is capable of rotating the drive shaft in an event of a failure of a second motor coupled to the drive shaft. A one-way clutch bearing, or similar device, may interface between a motor and the drive shaft to enable free rotation of the drive shaft in an event of the motor becoming inoperable, such as the motor freezing or locking in a position due to failure caused by overheating or caused by other conditions or events. Use of the second motor may secure a position of the drive shaft which may support the propeller in radial eccentric loading.

20 Claims, 14 Drawing Sheets

(51) Int. Cl.
  *B64C 11/48* (2006.01)
  *B64C 39/02* (2006.01)
  *B64C 11/18* (2006.01)
  *B64D 27/26* (2006.01)
  *B64D 27/02* (2006.01)

(52) U.S. Cl.
  CPC .. *B64C 2201/108* (2013.01); *B64C 2201/165* (2013.01); *B64D 2027/026* (2013.01)

(56) References Cited

U.S. PATENT DOCUMENTS

| | | | |
|---|---|---|---|
| 3,115,936 A | 12/1963 | Blews, Jr. | |
| 9,056,687 B2 | 6/2015 | Shachor et al. | |
| 9,688,400 B2* | 6/2017 | Hutson | B64C 39/024 |
| 2011/0108663 A1* | 5/2011 | Westenberger | B64D 27/02 244/60 |
| 2014/0161622 A1 | 6/2014 | Sharrow | |
| 2017/0089438 A1* | 3/2017 | Kolokythas | F16H 37/065 |
| 2017/0174323 A1 | 6/2017 | Roberts et al. | |

FOREIGN PATENT DOCUMENTS

| | | | |
|---|---|---|---|
| DE | 102012021339 | 4/2014 | |
| EP | 2060487 | 5/2009 | |
| EP | 2196392 | 6/2010 | |
| FR | 561508 | 10/1923 | |
| JP | H0669673 | 3/1994 | |
| WO | WO 2010053450 A2 * | 5/2010 | ........... F03D 1/0608 |
| WO | WO2011081577 | 7/2011 | |
| WO | WO2014056507 | 4/2014 | |
| WO | WO2015073084 | 5/2015 | |

OTHER PUBLICATIONS

The PCT Search Report dated Apr. 25, 2017 for PCT Application No. PCT/US16/67130, 17 pages.
Office Action for U.S. Appl. No. 14/973,610, dated Jan. 24, 2018, Roberts, "Redundant Aircraft Propulsion System Using Co-rotating Propellers Joined by Tip Connectors", 20 pages.
Office Action for U.S. Appl. No. 14/973,610, dated Jun. 14, 2018, Roberts, "Redundant Aircraft Propulsion System Using Co-rotating Propellers Joined by Tip Connectors", 16 pages.

* cited by examiner

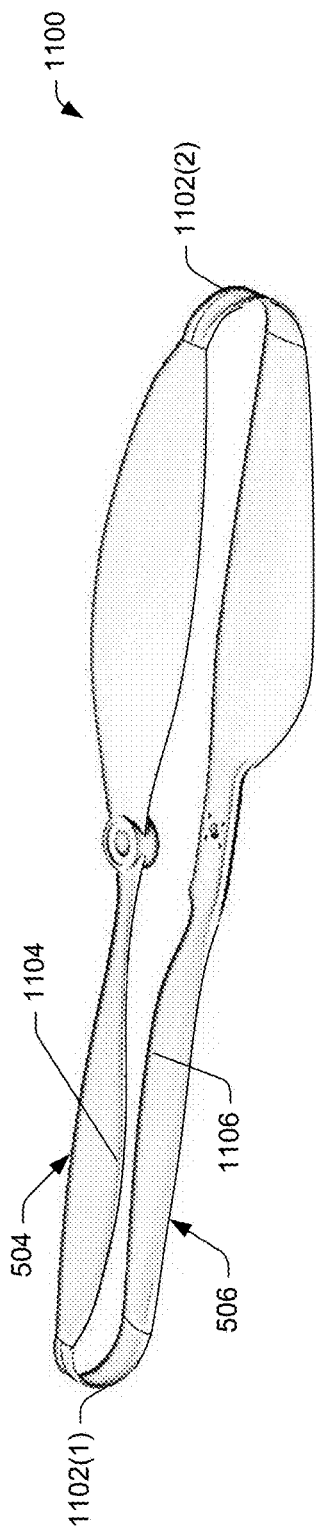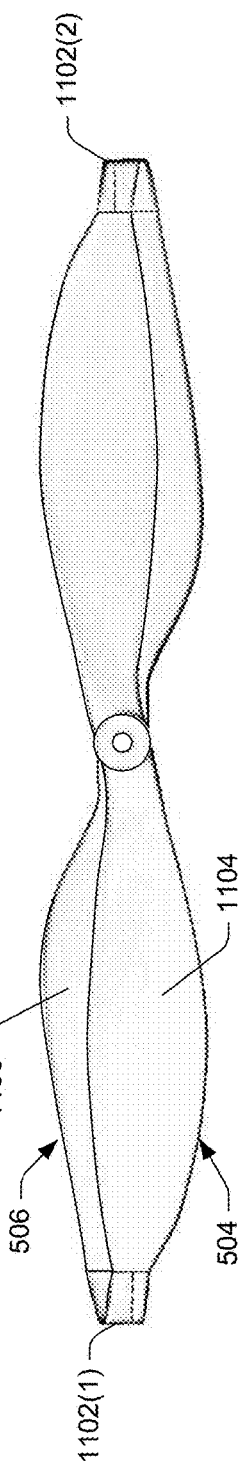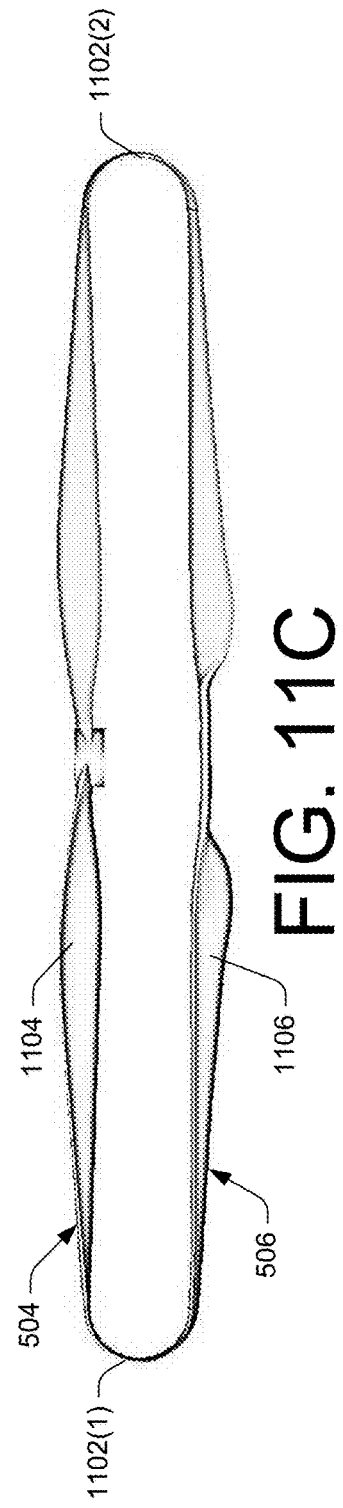

REDUNDANT AIRCRAFT PROPULSION SYSTEM USING MULTIPLE MOTORS PER DRIVE SHAFT

BACKGROUND

Conventional rotor-craft sometimes use multiple propellers (i.e., rotors) that are sometimes symmetrically located relative to a center of mass of the aircraft. Each propeller is coupled to a different drive shaft and powered by a different single motor using an electronic speed control (ESC), which controls the rotational speed of the motor, and thus the rotational speed of the propeller. Some rotor-crafts have four, six, eight, or more propellers.

When many propellers are used for propulsion of a rotor-craft, the rotor-craft may have some level or redundancy in case of failure of a motor or damage to a propeller. For example, an octocopter may continue controlled flight in the event of a failure of one of the motors that drive a particular propeller or damage to the particular propeller because the other seven propellers can typically maintain flight of the octocopter even when one propeller is no longer completely functional. However, rotor-craft having fewer propellers may not be able to maintain controlled flight in the event of a failure of a motor or damage to a propeller.

Propeller blades, like wings, create vortices during rotation of the propeller blades. The vortices create drag, which slows the propeller and causes inefficiency. In addition, propeller blades often create undesirable noise during operation at high rotational speeds at least partly due to airflow about the tips of blades of the propeller. When heavily loaded, propeller blades may deflect, which may reduce some efficiency of the propellers, and may even result in failure of the propeller if the deflection compromises the structural integrity of the propeller.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 10A is a perspective view of the illustrative closed propeller apparatus, FIG. 10B is a top plan view of the illustrative closed propeller apparatus, and FIG. 10C is a side elevation view of the illustrative closed propeller apparatus.

FIG. 11A-11C show illustrative co-propellers having different propellers blade profiles and configured in a closed configuration. FIG. 11A is a perspective view of the illustrative closed propeller apparatus, FIG. 11B is a top plan view of the illustrative closed propeller apparatus, and FIG. 11C is a side elevation view of the illustrative closed propeller apparatus.

DETAILED DESCRIPTION

This disclosure is directed to aircraft propulsion systems. In some embodiments, the aircraft propulsion systems may have redundancy based on use of multiple motors to drive (rotate) a single shaft coupled to a propeller. The motors may be selected such that a first motor is capable of rotating the drive shaft in an event of a failure of a second motor coupled to the drive shaft. A one-way clutch bearing, or similar device, may interface between a motor and the drive shaft to enable free rotation of the drive shaft in an event of the motor becoming inoperable, such as the motor freezing or locking in a position due to failure caused by overheating or caused by other conditions or events. Use of the second motor may secure a position of the drive shaft which may support the propeller in radial eccentric loading.

In various embodiments, the aircraft propulsion systems may have redundancy and/or achieve efficiencies using multiple propeller blades that are joined by tip connectors to form a closed propeller apparatus. The tip connectors may create continuous structure between adjacent tips of a first propeller and a second propeller. Use of the tip connectors may reduce vortices created near the tips of the propeller blades, which cause drag and slow the rotation of the propeller blades. The tip connectors may also reduce noise caused by rotation of propeller blades. Further, the tip connectors reduce or eliminate deflection of the propeller blades by creating a support structure to counteract forces that would otherwise cause deflection of the propeller blades, thereby improving propeller blade loading. Since both propellers are coupled together, the propellers will rotate at the same speed, which may eliminate a control feature used in some implementations that attempt to match rotational speed of different propellers. In some embodiments, the tip connectors may be formed of a malleable material and/or include one or more joints that enable at least one of the propellers to modify a pitch of blades of the propeller.

The closed propeller apparatus may be employed using multiple motors to create redundancy in both the power source and also the physical structures, such as the propeller blades, the drive shaft, and other physical structures. For example, the closed propeller apparatus has increased structural rigidity due to the coupling of the propellers by the tip connectors and possibly by coupling of the propellers by the drive shaft. This increased structural rigidity may increase a durability of the propeller blades in the event that the propeller blades make contact with another object. The motors may be located adjacent to outside surfaces of the closed propeller apparatus or may be located between the propeller blades.

The apparatuses, systems, and techniques described herein may be implemented in a number of ways. Example implementations are provided below with reference to the figures.

Figure 1A:
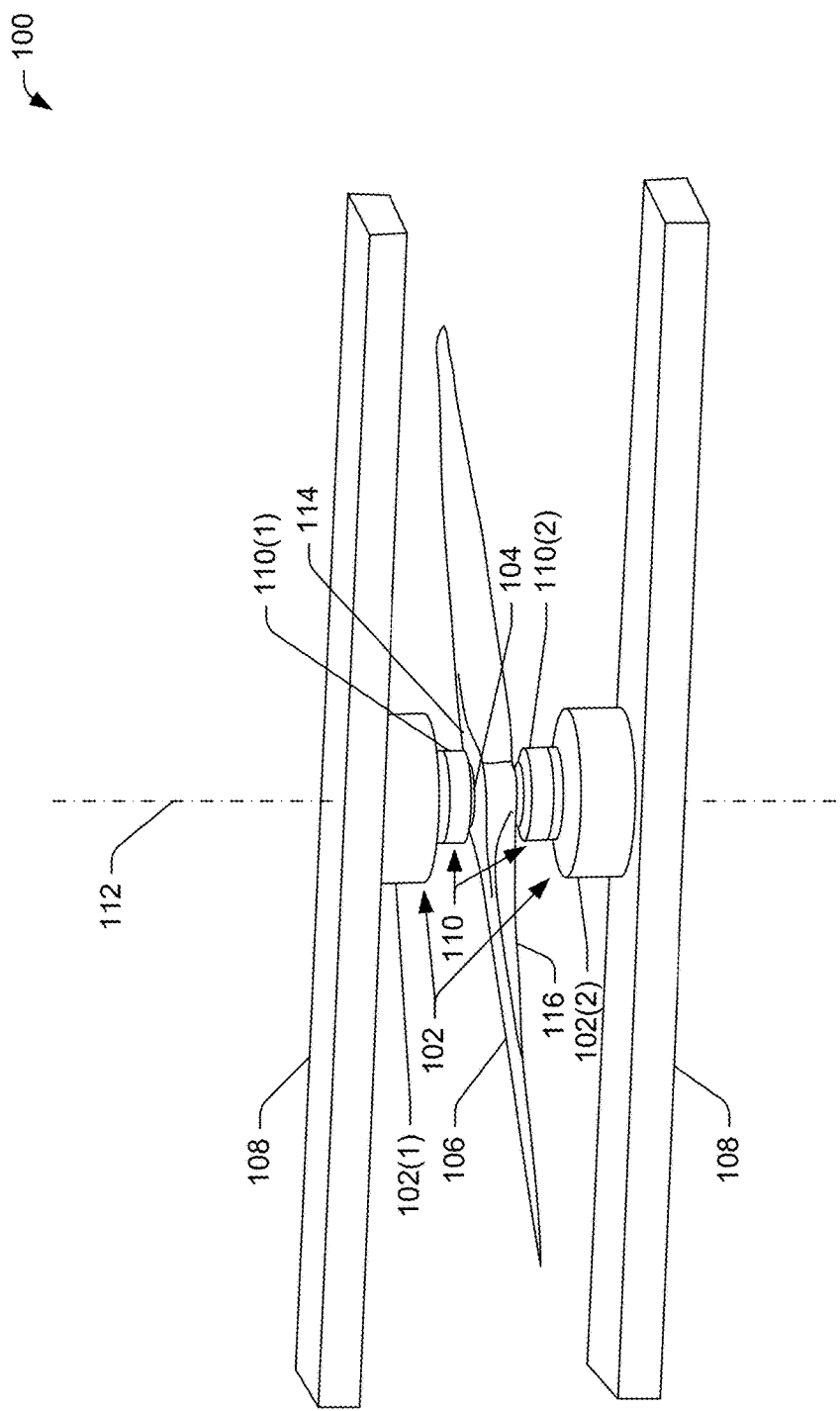
FIG. 1A is a perspective view of an illustrative redundant aircraft propulsion system using multiple motors to drive a single shaft coupled to a propeller.

FIG. 1A is a perspective view of an illustrative redundant aircraft propulsion system 100. The redundant aircraft propulsion system 100 may include using multiple motors 102 to rotate a drive shaft 104 coupled to a propeller 106. Although the propeller 106 is shown as having two blades, the propeller 106 (and any other propeller described herein) may have more propeller blades, such as three blades, four blades, five blades, or more. The motors 102 may include a first motor 102(1) and a second motor 102(2); however, additional motors may also be used in the redundant aircraft propulsion system 100 to achieve similar results. The motors 102 may be coupled to a frame 108, such as a motor mounting spar, which enables the motors 102 to impart rotation of the drive shaft 104 and the propeller 106 relative to the frame 108. The frame 108 may be a frame of an aircraft, such as an unmanned aerial vehicle (UAV), a helicopter, or other aircraft where the propeller 106 is used to propel the frame through air vertically, horizontally, or both. However, the frame 108 may be a frame for other devices, such as ground vehicles, maritime vessels, and/or stationary devices, such as fans.

Bearings 110 may be coupled to the drive shaft 104 and other structures, such as the motors 102 and/or the frame 108. In some embodiments, a first bearing set 110(1) is coupled between the first motor 102(1) and the drive shaft 104 and a second bearing set 110(2) is coupled between the second motor 102(2) and the drive shaft 104. The bearings 110 may enable free rotation of the drive shaft 104 in an event of one of the motors 102 (e.g., the first motor 102(1)) becoming inoperable, such as the first motor 102(1) freezing or locking in a position due to failure caused by overheating or caused by other conditions or events. In some embodiments, bearings may be coupled between the frame 108 and the drive shaft 104 to secure the drive shaft 104 in an axis 112 of rotation. In various embodiments, the motors 102 and/or the bearings 110 may secure the drive shaft 104 in the axis 112 of rotation. For example, use of the second motor 102(2) or the second bearing 102(2) in the configuration shown in FIG. 1A may secure a position of the drive shaft 104 and support the propeller 106, via the drive shaft 104, during radial eccentric loading.

As shown in FIG. 1A, the first motor 102(1) may be located on a first side 114 of the propeller 106 while the second motor 102(2) may be located on the second side 116 of the propeller 106. However, the motors 102 may be located in other positions relative to the frame 108 and propeller. For example, the motors 102 are shown as located between opposing structures of the frame 108; however, the motors 102 may be located outside the opposing structures of the frame 108, for example. As another example, two more motors may be stacked on a same side of the propeller 106.

During operation, the drive shaft 104 is subject to rotation up to a threshold number of revolutions per minute and up to a threshold torque, due to resistance caused by the propeller 106 moving air or other gases or fluids. The first motor 102(1) and/or the second motor 102(2) may be selected to operate at a maximum threshold torque that is less than the threshold torque, such that the combination of the motors 102 in operation reach or exceed design requirements for long term operation (e.g., continuous rotation of the drive shaft 104 and propeller 106 for up to a predetermined amount of time or indefinitely). In the event that one of the motors 102 becomes inoperable, the operational motor may continue to rotate the drive shaft 104 and the propeller 106, but possibly for a time less than the predetermined amount of time. For example, a single motor may be operated for short periods of time at a capacity that results in excess heat, which if continued for more than a threshold amount of time, may cause the single motor to also fail and become inoperable. Thus, operation with a single motor may enable operations to be performed that do not require peak or near peak output (e.g., do not require lifting or climbing an aircraft in altitude), but may be used at lower outputs (e.g., to maintain a cruising altitude and/or successfully land an aircraft).

In some embodiments, three or more motors may be coupled to the drive shaft 104. When one of the motors becomes inoperable, multiple motors may still operate to cause the rotation, which may enable use of motors having less power, such that a sum of the maximum output of the motors reaches or exceeds the threshold torque, but possibly exceeds the threshold torque by less than implementations where fewer motors are used in the redundant aircraft propulsion system 100.

Figure 1B:
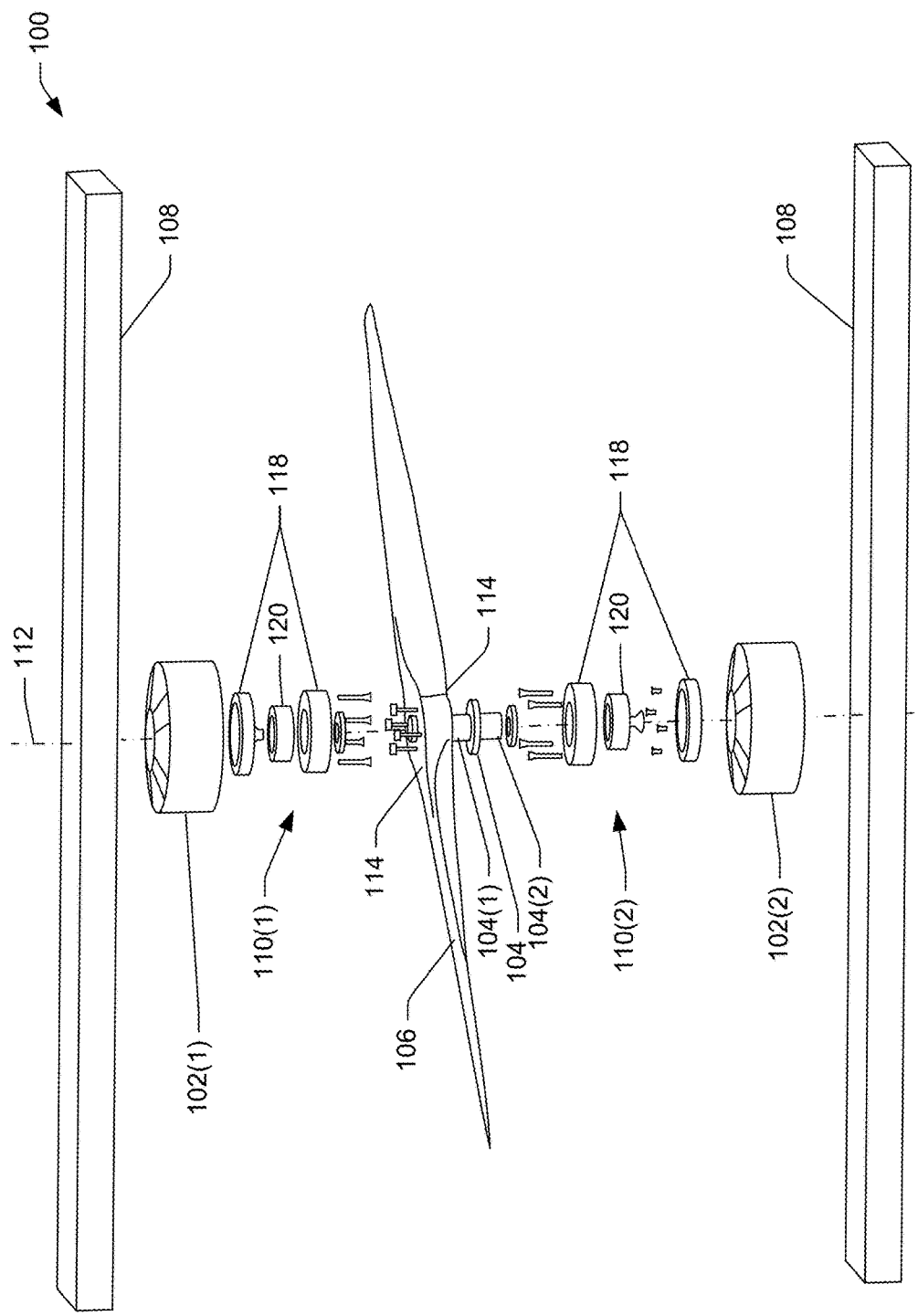
FIG. 1B is an exploded perspective view of the illustrative redundant aircraft propulsion system shown in FIG. 1.

FIG. 1B is an exploded perspective view of the illustrative redundant aircraft propulsion system 100 shown in FIG. 1, which show an illustrative assembly of components of the redundant aircraft propulsion system 100. As shown in FIG. 2B, the first motor 102(1) may be located proximate to a first portion 104(1) of the drive shaft 104 while the second motor 102(2) may be located proximate to a second portion 104(2) of the drive shaft 104.

The bearings 110(1) and 110(2) may include bearing housings 118 and a one-way clutch bearing 120, which is configured to rotate freely in one direction and prevent rotation in a second direction that is opposite the first direction. Thus, the one-way clutch bearing 120 may prevent rotation (in the second direction), which enables a motor to impart rotational force to the drive shaft 104 via the one-way clutch bearing 120. When a motor fails, the bearing freely rotates in the first direction as the other motor rotates the drive shaft 104. The bearings 110(1)-(2) may be barrel shaped or formed in other shapes to create a compact assembly or form-factor of the redundant aircraft propulsion system 100. In some embodiments, the bearings 110 may be integrated with the motors 102 in a custom motor implementation. Thus the motors 102 may include the one-way clutch bearing 120, which may be coupled to the motor and possibly integrally formed with the motor prior to assembly of the redundant aircraft propulsion system 100.

The motors 102 may be brushless direct current (DC) motors and/or other types of motors that generated a desired speed of rotation of the drive shaft at a torque experienced during typical operation (e.g., a maximum operational torque). However, other types of motors may be used, such as DC brush motors, alternating current (AC) motors, gasoline engines, and/or other types of rotation generating devices. In some embodiments, the first motor 102(1) may be a different type of motor than the second motor 102(2). As discussed below, gearing systems may also be used, which may be included in the motors or driven by the motors.

The various components of the redundant aircraft propulsion system 100 may be coupled using any one of known coupling mechanisms and/or features, including threaded fasteners, adhesives, friction couplings, and/or other types of coupling mechanism/features.

Figure 2:
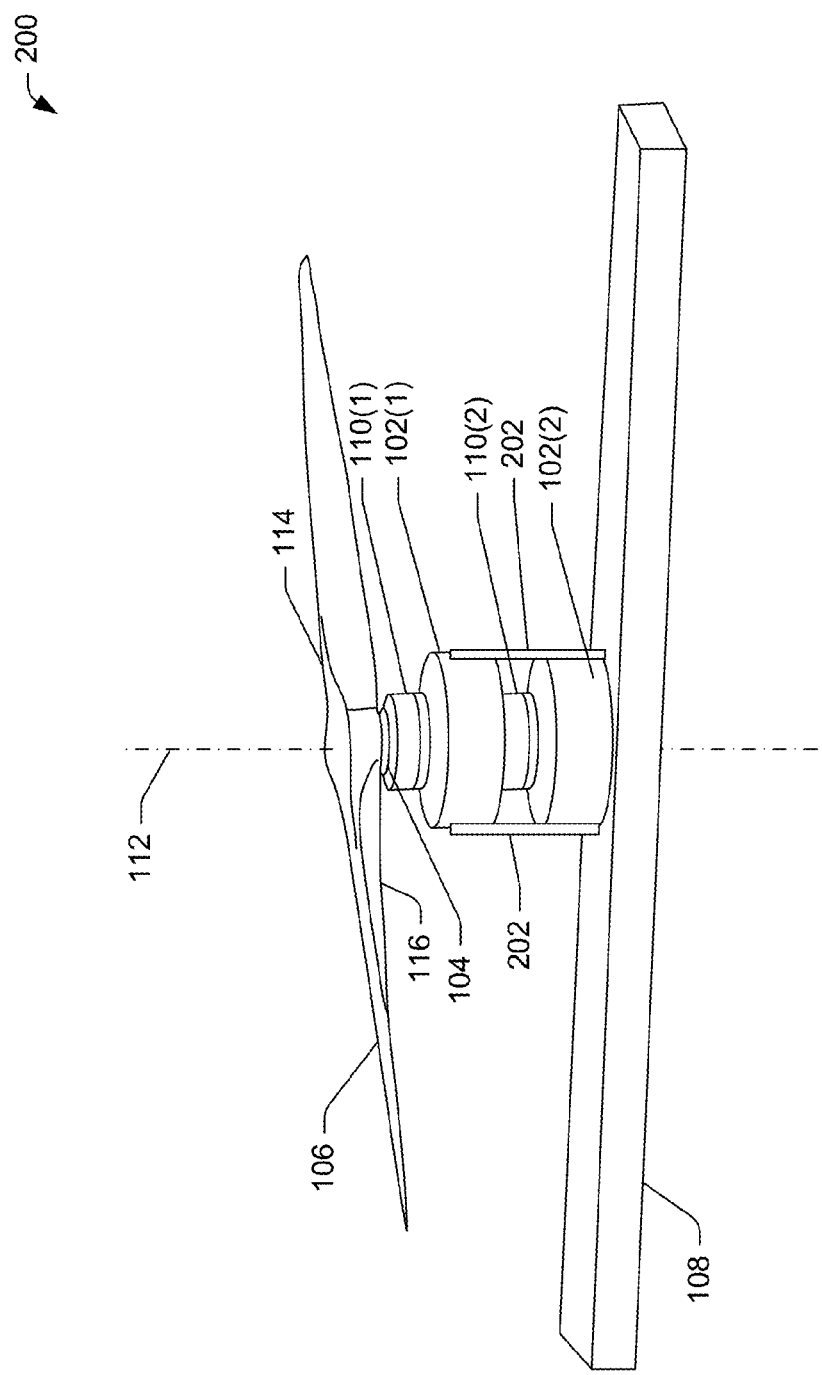
FIG. 2 is a perspective view of an illustrative redundant aircraft propulsion system using stacked multiple motors to drive a single shaft coupled to a propeller.

FIG. 2 is a perspective view of an illustrative redundant aircraft propulsion system 200 using a stacked configuration of multiple motors to rotate the drive shaft 104 coupled to the propeller 106. The first motor 102(1) and the second motor 102(2) may be located on a same side of the propeller 106, such as on the second side 116 of the propeller 106. The motors 102(1)-(2) may be coupled to the frame 108, possibly using a coupling support device 202. The coupling support device 202 may secure a position of the first motor 102(1) relative to the second motor 102(2) and/or relative to the frame 108. The redundant aircraft propulsion system 200 may include the bearings 110(1)-(2), which may be located between the respective motors and the drive shaft 104 to enable rotation of the drive shaft 104 in the event that one of the motors becomes inoperable. The motors 102(1)-(2) and/or the bearings 110(1)-(2) may secure the drive shaft 104 in the axis 112 of rotation.

The redundant aircraft propulsion system 200 may be used in configurations where a first side 114 of the propeller is not adjacent to the frame 108, as shown in FIG. 2. For example, when the propeller is used on a fore and/or aft side of a wing or fuselage of an aircraft and where the axis 112 is substantially aligned with the horizon of Earth during forward flight of the aircraft, the frame 108 may only be available for coupling on a single side of the propeller 106.

Figure 3:
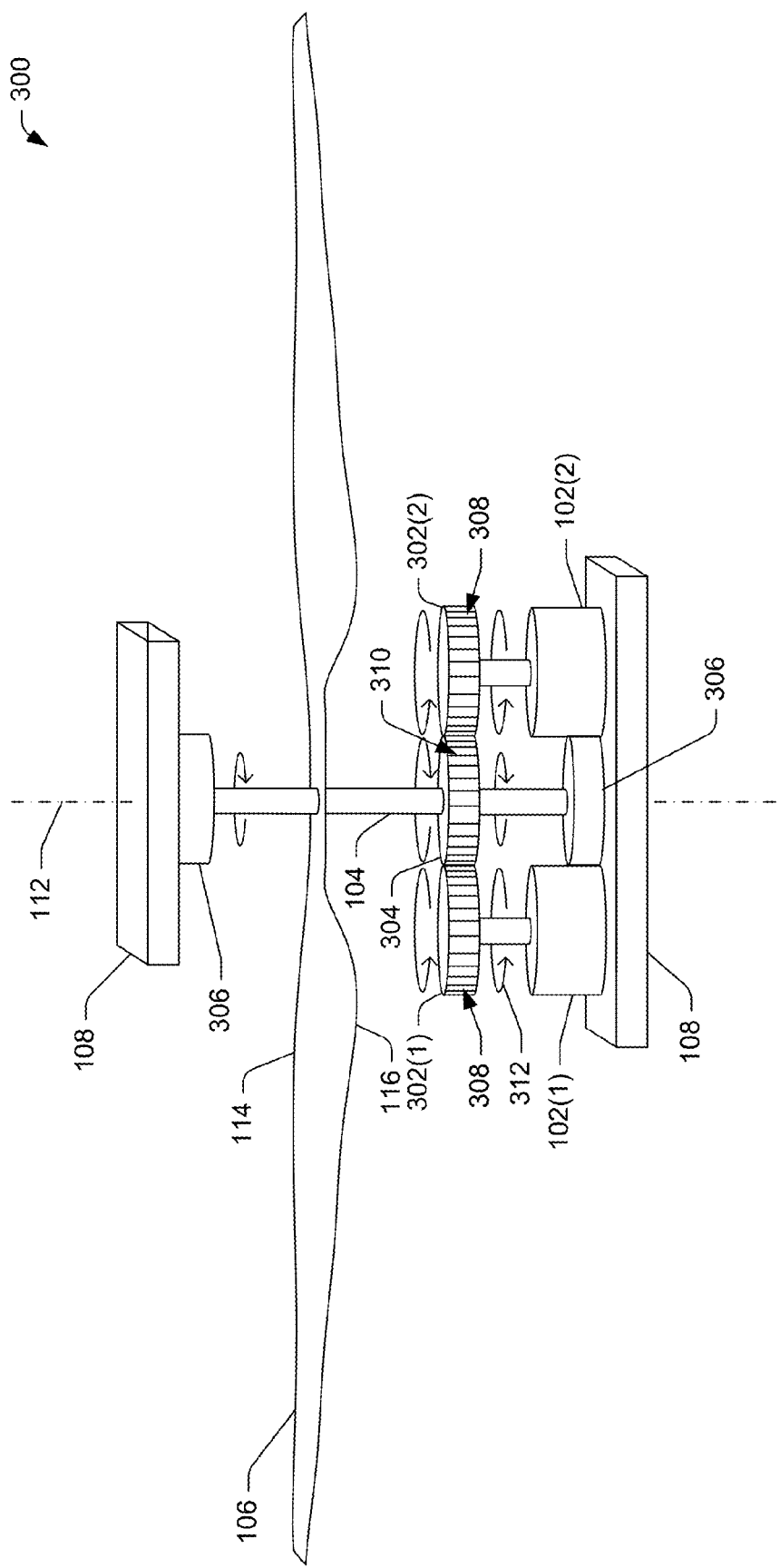
FIG. 3 is a perspective view of an illustrative redundant aircraft propulsion system using multiple motors that rotate cogwheels that engage a cogwheel on a shaft coupled to a propeller.

FIG. 3 is a perspective view of an illustrative redundant aircraft propulsion system 300. The redundant aircraft propulsion system 300 may include the first motors 102(1) and the second motor 102(2) which may rotate a first cogwheel 302(1) and a second cogwheel 302(2), respectively, directly or using a shaft coupled to a respective cogwheel. The cogwheels 302(1)-(2) may engage a drive shaft cogwheel 304 and cause rotation of the drive shaft cogwheel 304 when at least one of the motors 102(1)-(2) is operational. The drive shaft cogwheel 304 is coupled to the drive shaft 104, which is coupled to the propeller 106. Thus, rotation of one or more of the cogwheels 302(1)-(2) results in rotation of the propeller. The drive shaft 104 may be secured in the axis 112 of rotation by bearings 306, which may be coupled to the frame 108. Although both motors are shown in FIG. 3 as being located proximate to the second side 116 of the propeller 106, the motors could be located on either side or on both sides (using another drive shaft cogwheel), and/or in other locations relative to the propeller 106 or the frame 108.

The cogwheels 302(1)-(2) may include cogs 308 that engage corresponding drive shaft cogs 310 on the drive shaft cogwheel 304. The cogs 308 may be configured to engage the drive shaft teeth 310 during rotation of the cogwheels 302(1)-(2) in a first direction 312 and not engage the drive shaft teeth 310 during rotation of the cogwheels 302(1)-(2) in a second direction that is opposite the first direction 312 (from the perspective of the drive shaft cogwheel 304). For example, the cogs 308 may be spring loaded and may only cause rotation of the drive shaft cogwheel 304, via the drive shaft teeth 310, during rotation in the first direction, but may be compressed by the drive shaft cogs 310 and not cause rotation of the drive shaft cogwheel 304 during rotation in the second direction (from the perspective of the drive shaft cogwheel 304). Using the spring loaded cogs, or other mechanisms that create a similar effect, the drive shaft 104 may rotate even when one of the motors 102(1)-(2) becomes inoperable. Other mechanisms may enable the drive shaft 104 may rotate even when one of the motors 102(1)-(2) becomes inoperable, such as a mechanism that moves the inoperable motor and/or corresponding cogwheel to prevent the corresponding cogwheel from inhibiting rotation of the drive shaft cogwheel 304, such as a clutch device.

In some embodiments, the cogwheels 302(1)-(2) may use the one-way clutch bearings to enable rotation of a first motor in the event that a second motor becomes inoperable. The one-way clutch bearings may be employed as described above, such as by interfacing between respective motors and corresponding shafts that drive the respective cogwheels.

In some embodiments, the at least one of the cogwheel 302(1), the cogwheel 302(2), or both have a different number of cogs than the drive shaft cogwheel 304 to create a geared system. The geared system may enable gearing up or gearing down, and thus may increase or decrease a rotational speed of the drive shaft 104 compared to a rotational speed of one or both of the motors 102(1)-(2).

Figure 4:
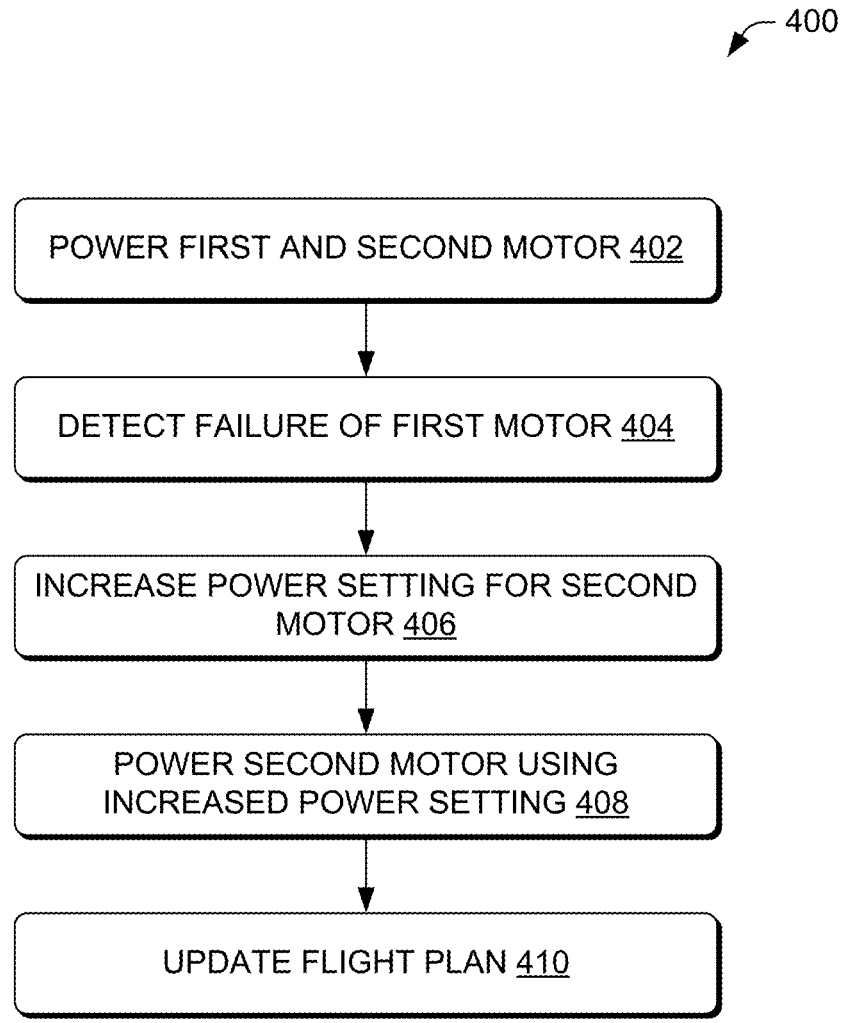
FIG. 4 is a flow diagram of illustrative operation of powering the motors of the redundant aircraft propulsion system in response to detecting a failure of a motor.

FIG. 4 is a flow diagram of illustrative process 400 of powering the motors of the redundant aircraft propulsion system in response to detecting a failure of a motor. The process 400 may be performed by any redundant aircraft propulsion system described herein that uses two or more motors to rotate a drive shaft coupled to a propeller. The process 400 is illustrated as a collection of blocks in a logical flow graph, which represent a sequence of operations that can be implemented in hardware, software, or a combination thereof. It should also be appreciated that the logical flow path depicted in FIG. 4 is not to be construed to indicate that the described process operations need be performed in any particular order unless otherwise expressly and unambiguously stated as such elsewhere herein. Stated alternatively, the logical flow paths herein represent but a few of many possible orders which the steps may be performed. In the context of software, the blocks represent computer-executable instructions stored on one or more computer-readable storage media (e.g., machine readable storage media) that, when executed by one or more hardware processors, perform the recited operations. Generally, computer-executable instructions include routines, programs, objects, components, data structures, and the like that perform particular functions or implement particular abstract data types. Embodiments may be provided as a computer program product including a non-transitory computer-readable storage medium having stored thereon instructions (in compressed or uncompressed form) that may be used to program a computer (or other electronic device) to perform processes or methods described herein. The computer-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/computer-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded. The order in which the operations are described is not intended to be construed as a limitation, and any number of the described blocks can be combined in any order and/or in parallel to implement the process 400.

At 402, one or more controllers, such as electronic speed controls (ESCs), may power the first motor 102(1) and the second motor 102(2) to cause rotation of the drive shaft 104 and rotation of the propeller 106 as described above. The motors may be powered at a first power setting.

At 404, the one or more controllers, a feedback circuit, and/or other device may detect failure of a motor, such as the first motor 102(1). However, the process works similarly upon failure of the second motor 102(2). The failure of the motor may cause the motor to be inoperable, and possibly be jammed, frozen, or otherwise incapable of rotation.

At 406, the one or more controllers may increase a power setting of the second motor 102(2) in response to the detection at the operation 404. The increase may cause the second motor to operate at more revolutions per minute for a given input than the first power setting used at the operation 402. By increasing the power setting for the second motor, the second motor may continue to rotate the drive shaft at a rotational speed that maintains a desired operation, such as continued flight of an aircraft, for example. In some embodiments where a feedback loop is used to determine a rotational speed of the drive shaft, the operation 406 may be omitted.

At 408, the one or more controllers, such as electronic speed controls (ESCs), may power the second motor 102(2) at the increased power setting to cause rotation of the drive shaft 104 and rotation of the propeller 106 as described above, even when the first motor 102(1) is inoperable (e.g., frozen, nonfunctional, etc.). As described above, one-way clutch bearings, or other devices described herein that produce a similar effect, may enable the drive shaft to freely rotate despite the inoperability of the first motor.

At 410, the one or more controllers may update a flight plan when the motors operate a propeller of an aircraft. The update of the flight plan may include causing aircraft to execute a landing and/or limiting or updating performance expectations/thresholds for the aircraft (e g, limiting climbing and/or limiting other power intensive operations). In some embodiments, the second motor 102(2) may be powerful enough to continue flight of an aircraft without any change or without any significant change in the flight plan, such as when the second motor 102(2) is configured to operate at a maximum threshold torque that is less than a threshold torque, where the drive shaft is subject to rotation up to a threshold number of revolutions per minute and up to the threshold torque.

Figure 5A:
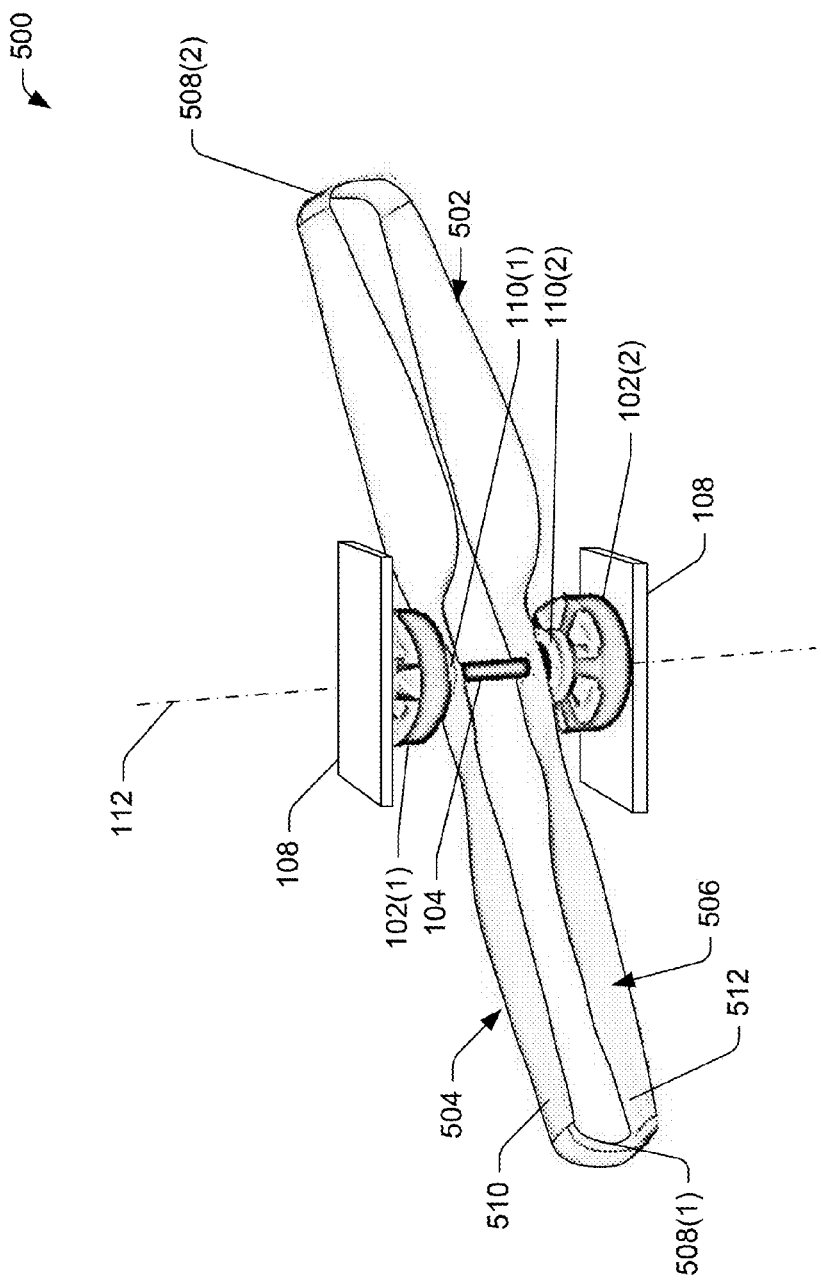
FIG. 5A is a perspective view of an illustrative redundant aircraft propulsion system using multiple motors to drive a single shaft coupled to an illustrative closed propeller apparatus.

FIG. 5A is a perspective view of an illustrative redundant aircraft propulsion system 500. The redundant aircraft propulsion system 500 includes a closed propeller apparatus 502 that includes a first propeller 504 (sometimes referred to herein as a top propeller) coupled to a second propeller 506 (sometimes referred to herein as a bottom propeller) by a first tip connector 508(1) and a second tip connector 508(2). The first tip connector 508(1) may couple a first tip 510 of the first propeller 504 to a second tip 512 of the second propeller 506 to create a continuous structure joining the first propeller 504 to the second propeller 506. Likewise, the second tip connector 508(2) may couple adjacent tips of the propellers 504, 506. A cross-section of the tip connectors may resemble a tear drop or other aerodynamic profile that has minimal drag while having structural rigidity.

Although the first propeller 504 and the second propeller 5069 are shown as having two blades, the propellers (and any other propeller described herein) may have more propeller blades, such as three blades, four blades, five blades, or more, which may be coupled together in a similar manner using corresponding tip connectors. A distance between the first propeller 504 and the second propeller 506 may be selected to create optimal thrust from the respective propellers.

Use of the tip connectors 508(1)-(2) may reduce vortices created near the tips 510, 512 of the propellers 504, 506, which cause drag and slow the rotation of the propeller blades. The tip connectors 508(1)-(2) may also reduce noise caused by rotation of propellers. Further, the tip connectors 508(1)-(2) reduce or eliminate deflection of the propellers by creating a support structure to counteract forces that would otherwise cause deflection of the propellers, thereby improving propeller blade loading. Since both propellers are coupled together, the propellers will rotate at the same speed, which may eliminate a control feature used in some implementations that attempt to match rotational speed of different propellers. In some embodiments, the tip connectors 508(1)-(2) may be formed of a malleable material and/or include one or more joints that enable at least one of the propellers to modify a pitch of blades of the propeller.

As shown in FIG. 5A, the first propeller 504 and the second propeller 506 may rotate about the same axis 112 and may rotate in rotational planes that are parallel to one other. The closed propeller apparatus 502 may include the drive shaft 104, which may be coupled to the closed propeller apparatus 502, and possibly integrally formed with the closed propeller apparatus 502. The drive shaft 104 may create additional supporting structure for the closed propeller apparatus 502, which is in addition to the tip connectors 508(1)-(2), which also provide supporting structure for the closed propeller apparatus 502.

The drive shaft 104 may be coupled to the motors 102(1)-(2), possibly via the one-directional clutch bearings 110(1)-(2), as discussed above with reference to FIG. 1A. In some embodiments, the redundant aircraft propulsion system 500 may include a single motor to rotate the drive shaft 104 and, therefore, may not have the motor redundancy as described above with reference FIG. 1A.

Figure 5B:
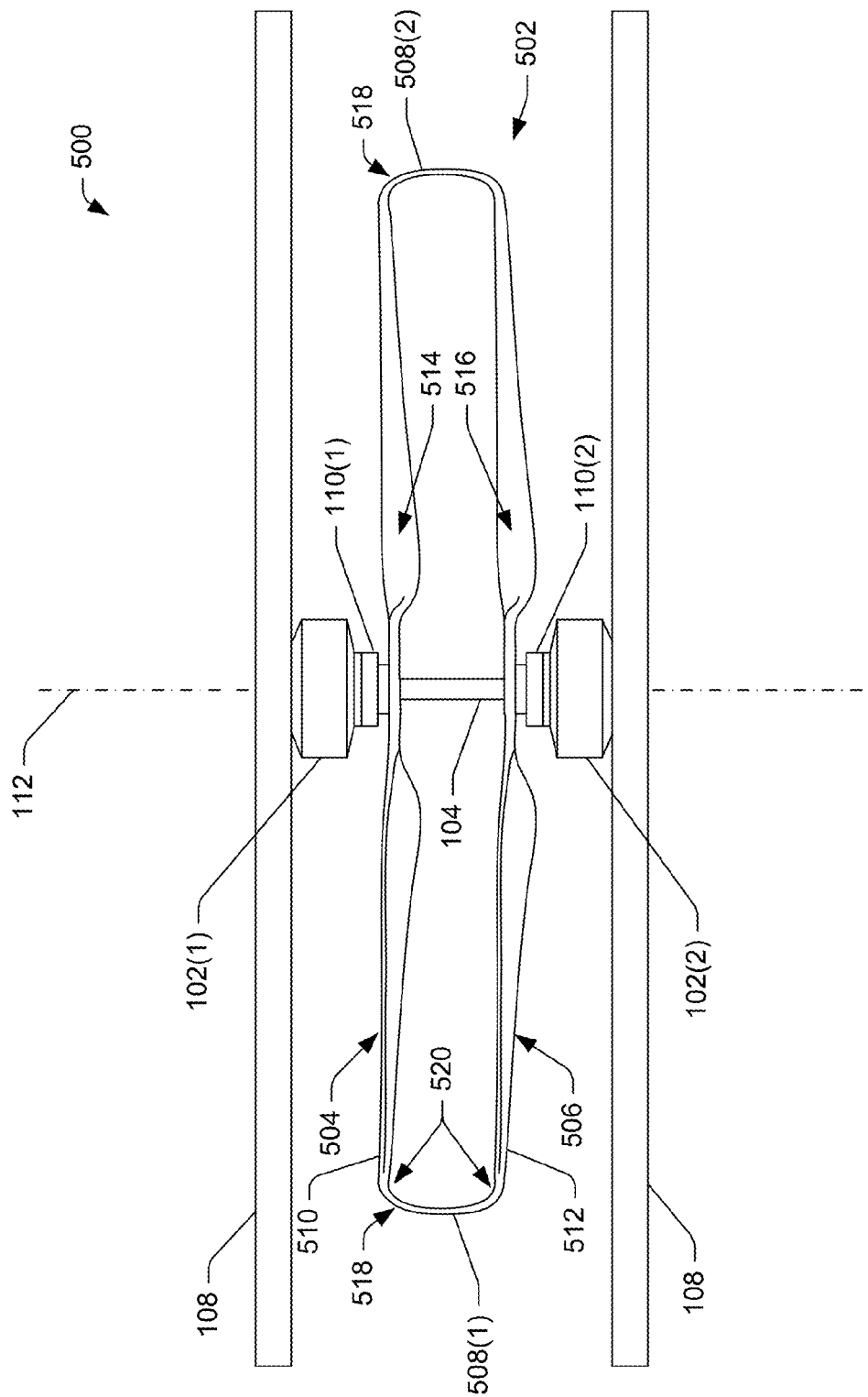
FIG. 5B is a side elevation view of the redundant aircraft propulsion system shown in FIG. 5A. The motors are positioned on opposite sides of the closed propeller apparatus.

FIG. 5B is a side elevation view of the redundant aircraft propulsion system 500 shown in FIG. 5A. The first propeller 504 may include a first pitch 514 while the second propeller 506 may include a second pitch 516. The pitch may be an angle of propeller blades rotated about an axis that is perpendicular to a line tangent to the drive shaft. The greater the pitch, the more air the propeller blades move during rotation.

In some embodiments, the first pitch 514 and the second pitch 516 may be fixed pitches and thus not configured for movement of propeller blades with respect to a spinner (hub) or axis of rotation. The first pitch 514 and the second pitch 516 may or may not be equivalent. For example, the first pitch 514 may have a lesser angle (and thus move less air) than the second pitch 516. However, the first pitch 514 may be greater than the second pitch 516 in some implementations. Use of propellers having different blade designs or profiles is discussed in more detail with reference to FIGS. 11A-C.

In various embodiments, the first propeller 504, the second propeller 506, or both may be configured for variable pitch, such as by use of actuators that cause a pitch (or angle) of propeller blades to change relative to the spinner (hub) by mechanically rotating the blades about an axis that is perpendicular to a line tangent to the drive shaft. In such embodiments, the tip connectors 508(1)-(2) may include malleable portions 518 which may enable a change in the pitch of the blades of the first propeller 504, the second propeller 506, or both. The malleable structure 518 may be formed of rubber, plastic, and/or other malleable substances that enable some deformation while still providing compression forces against the respective propellers and while generally maintaining a design profile, such as curved radiuses 520. The curved radiuses 520 may be selected to minimize drag and/or minimize noise caused during rotation of the closed propeller apparatus 502. Thus, the malleable structure 518 enables movement of the pitch of the blades while maintaining the continuous structure joining the first propeller 504 and the second propeller 506. In various embodiments, the malleable structure 518 may enable a dynamic change to an offset between the first blade 504 and the second blade 506, which may be performed based on a rotational speed of the closed propeller apparatus, for example. Actuators may be used to move the propellers together or apart to vary the offset.

Figure 6:
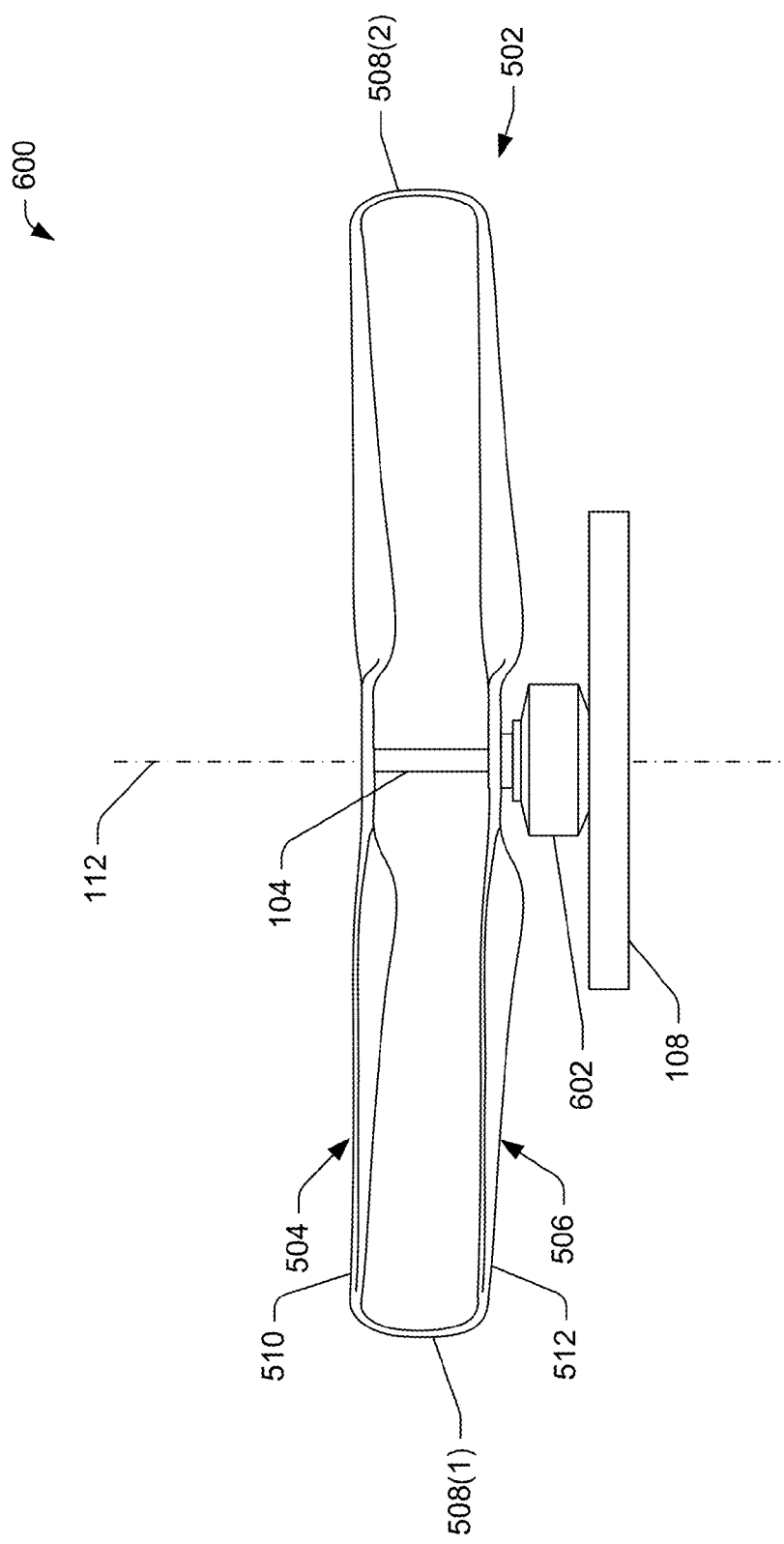
FIG. 6 is a side elevation view of a redundant aircraft propulsion system having a single motor.

FIG. 6 is a side elevation view of a redundant aircraft propulsion system 600 having a single motor 602. As shown, the redundant aircraft propulsion system 600 may include the frame 108 on a first side of the closed propeller apparatus 502 that is used in part to secure the motor 602. The drive shaft 104 may or may not extend between the first propeller 504 and the second propeller 506. For example, when the drive shaft 104 does not extend between the propellers, the tip connectors 508(1)-(2) may transfer rotation imparted by the motor 602 to the first propeller 504 when the motor 602 causes the second propeller 506 to rotate.

Figure 7:
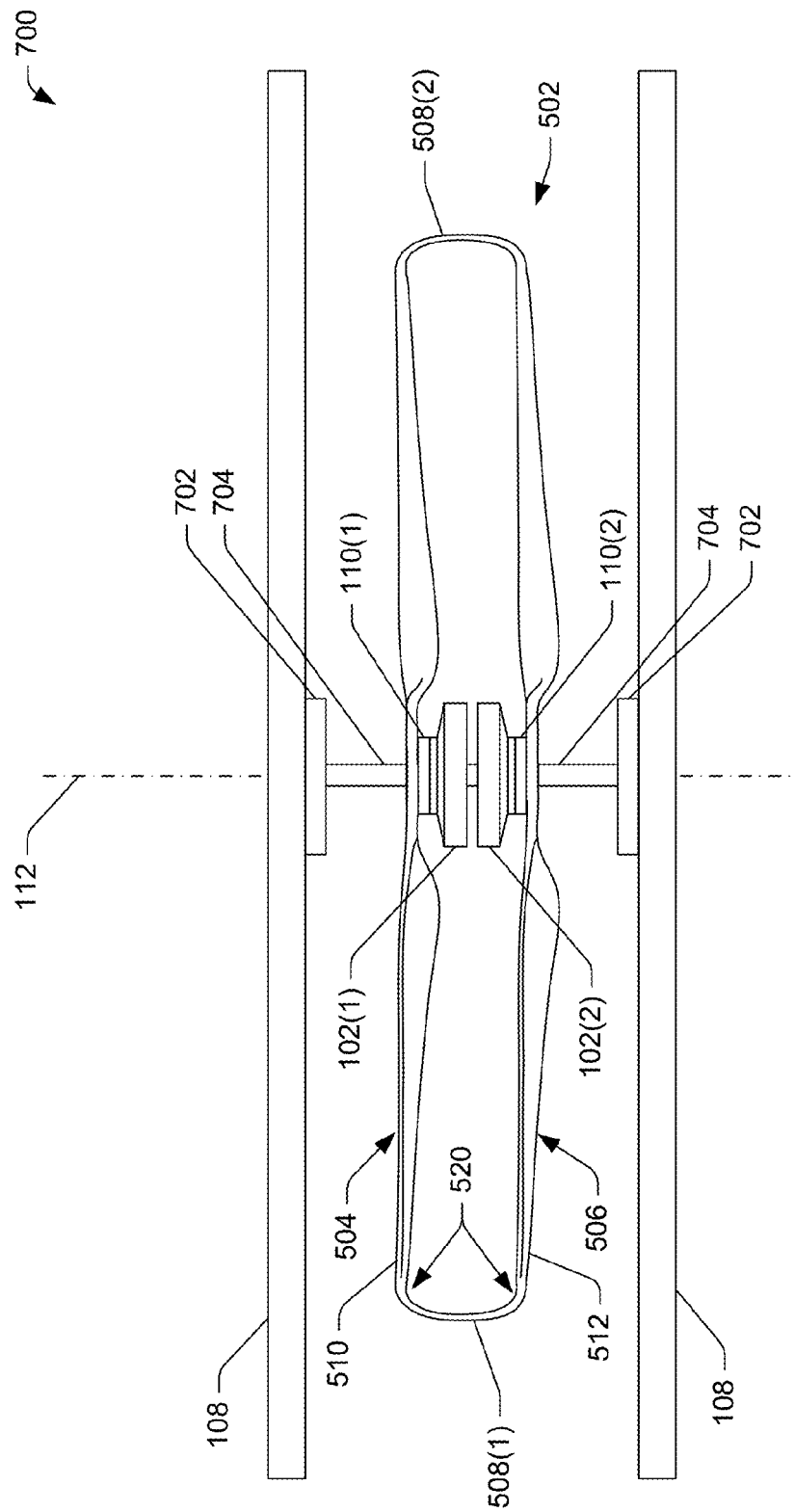
FIG. 7 is a side elevation view of a redundant aircraft propulsion system having motors positioned between the propellers.

FIG. 7 is a side elevation view of a redundant aircraft propulsion system 700. The redundant aircraft propulsion system 700 may include the first motor 102(1) and the second motor 102(2) located between the first propeller 504 and the second propeller 506. Location of the motors between the propellers may enable a smaller form factor (or envelope) to contain the redundant aircraft propulsion system 700. In some embodiments, the redundant aircraft propulsion system 700 may include the one-way clutch bearings 110(1)-(2), which may be located between the motors and the propellers.

The redundant aircraft propulsion system 700 may include bearings 702 to secure a drive shaft 704 along the axis 112 of rotation. The drive shaft 704 may include a fixed body, possibly within a rotatable exterior body of the drive shaft 704, which is stationary and used to fix the motors to the frame 108. The fixed body may be used to power the motors while the rotatable exterior body may be coupled to the propellers and/or the one-way clutch bearings 110(1)-(2) to cause rotation thereof. However, other configurations may be used for the drive shaft 704, such as a configuration that has the fixed body outside of a rotating inner body.

Figure 8:
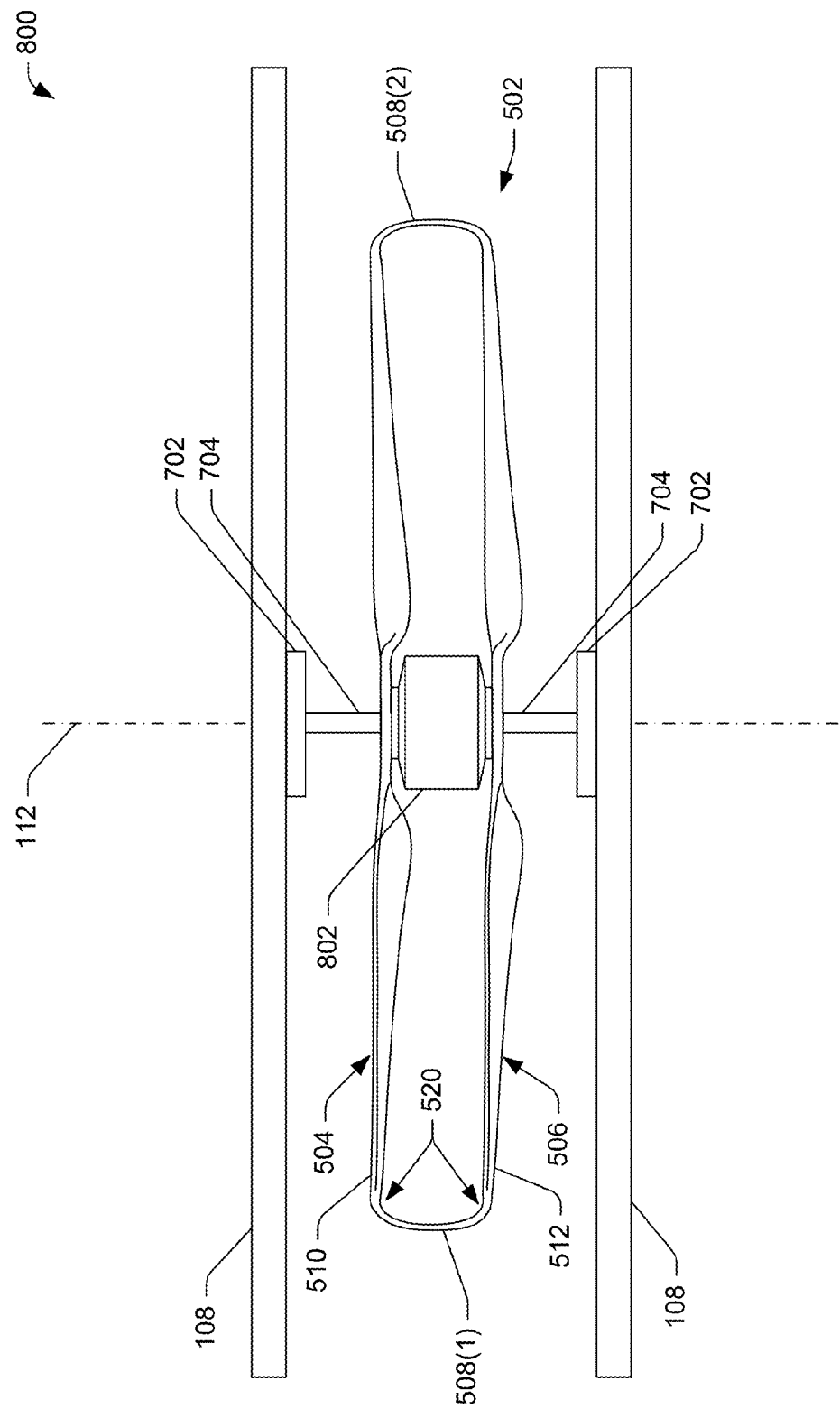
FIG. 8 is a side elevation view of a redundant aircraft propulsion system having a single motor positioned between the propellers.

FIG. 8 is a side elevation view of a redundant aircraft propulsion system 800 having a single motor 802 positioned between the co-rotating propellers. In some embodiments, the single motor may be located outside of the closed propeller apparatus 502 rather than between the propellers 504, 506. In such instances, the frame 108 may not include a support on each side of the closed propeller apparatus 502.

Figure 9:
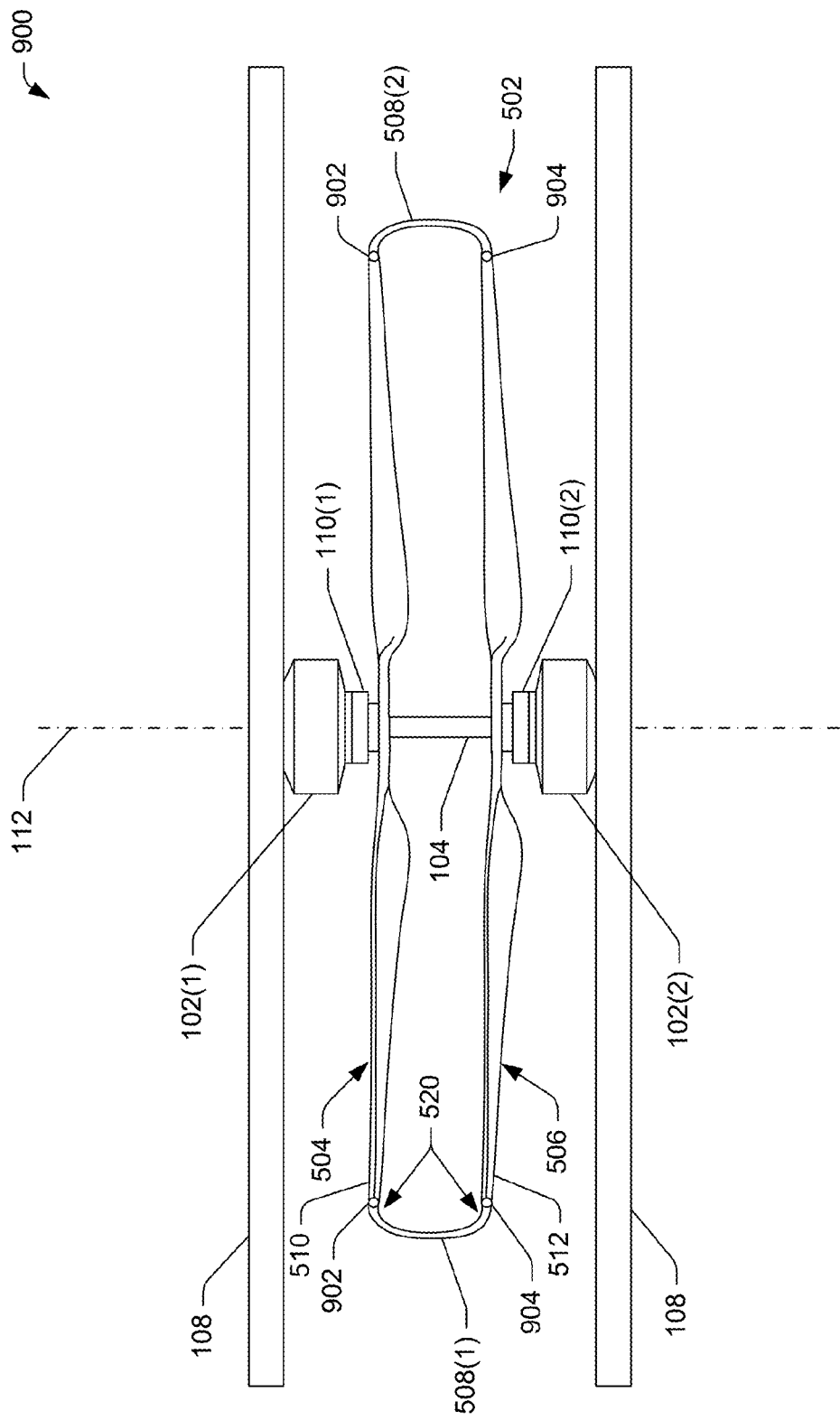
FIG. 9 is a side elevation view of a redundant aircraft propulsion system having a plurality of joints that enable variable pitch operation of at least one of the propellers.

FIG. 9 is a side elevation view of a redundant aircraft propulsion system 900 having a plurality of joints that enable variable pitch operation of at least one of the propellers. In various embodiments, the first propeller 504, the second propeller 506, or both may be configured for variable pitch, such as by use of actuators that cause a pitch (or angle) of propeller blades to change by mechanically rotating the blades about an axis that is perpendicular to a line tangent to the drive shaft. In such embodiments, a first joint 902 may be located on the tip connector 508(1) or between the tip connector 508(1) and the first tip 510. A second joint 904 may be located on the tip connector 508(2) or between the tip connector 508(2) and the second tip 512. Additional joints may be used to enable a smooth and continuous shape of the tip connectors 508(1)-(2), even after a change in pitch of one or more propeller blades. The additional joints may also be used to create a linkage as discussed below. In some embodiments, the joints may form a chain-like linkage that comprises many different movable parts.

The joints 902, 904 may enable a change in the pitch of the blades of the first propeller 504, the second propeller 506, or both. The joints 902, 904 may permit a change in the pitch of blades while generally maintaining a design profile of the closed propeller apparatus 502, such as the curved radiuses 520. The curved radiuses 520 may be selected to minimize drag and/or minimize noise caused during rotation of the closed propeller apparatus 502. Thus, the joints 902, 904 enable movement of the pitch of the blades while maintaining the continuous structure joining the first propeller 504 and the second propeller 506. In some embodiments, the joints 902, 904 may create a linkage system that enables a single actuator or actuators of the first propeller 504 to modify the pitch of blades of the second propeller 506 by mechanically transferring the changes of the pitch from the first propeller 504 to the second propeller.

In some embodiments, the joints 902, 904 may enable rotation of the tip connector 508(1), the tip connector 504(2), or both in a way that causes an air break, which may act to slow the rotational speed of the closed propeller apparatus 502. In various embodiments, modifications to the angle or orientation of the tip connectors relative to the propellers 504,506 may also result in different amounts of noise being generated during rotation of the closed propeller apparatus 502. In various embodiments, the joints 902, 904 may enable a dynamic change to an offset between the first blade 504 and the second blade 506, which may be performed based on a rotational speed of the closed propeller apparatus, for example. Actuators may be used to move the propellers together or apart to vary the offset.

Figure 10A:
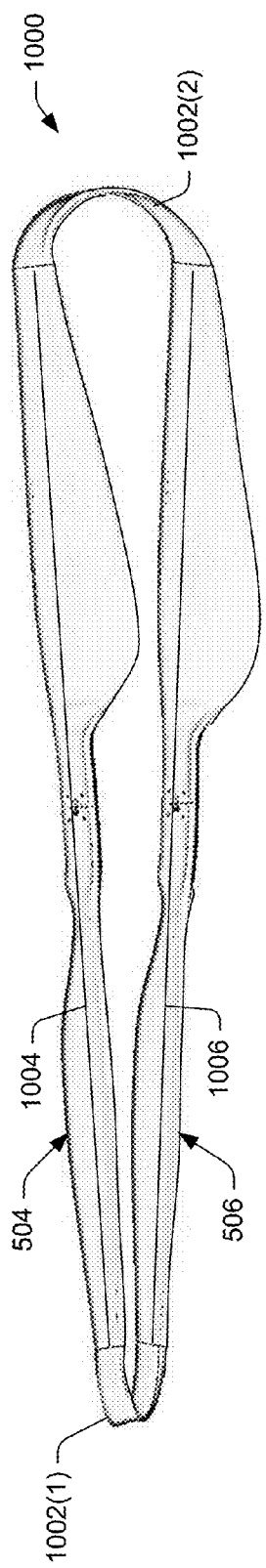
FIG. 10A-10C show illustrative co-propellers having an angle offset in the plane of rotation of the propellers.
Figure 10B:
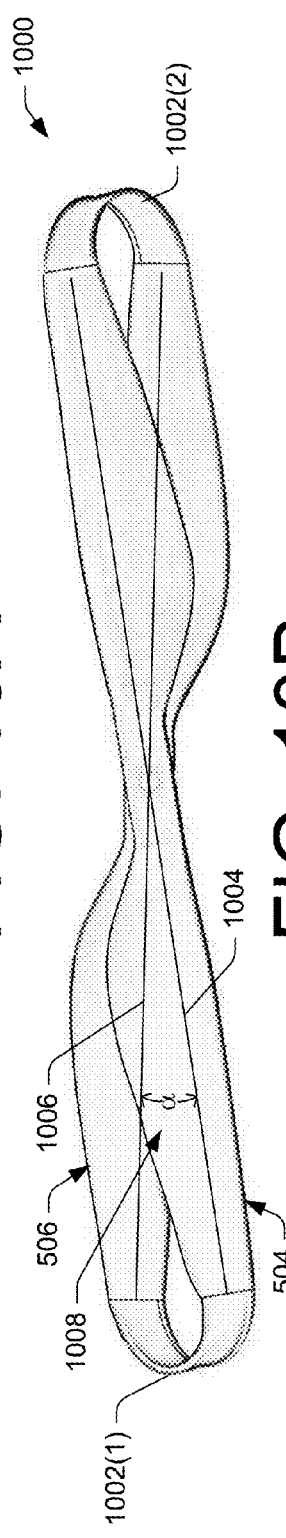
Figure 10C:
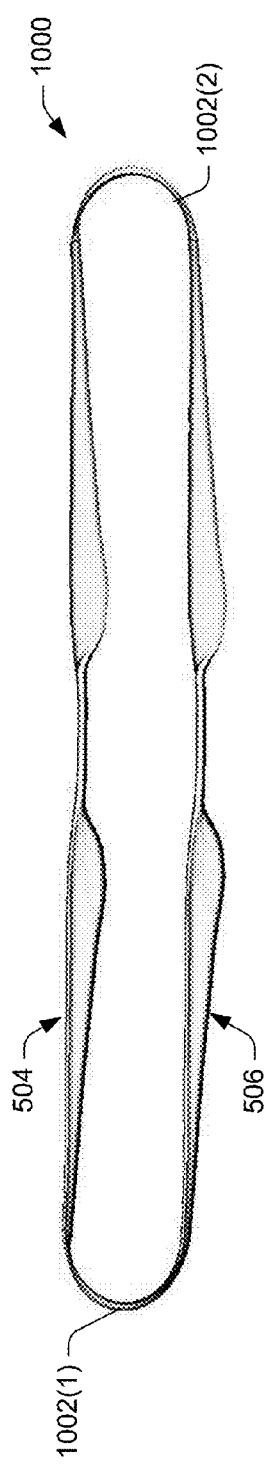

FIG. 10A-10C show an illustrative closed propeller apparatus 1000. FIG. 10A is a perspective view of the closed propeller apparatus. As shown in FIG. 10A, the closed propeller apparatus 1000 may include the first propeller 504 and the second propeller 506 that are connected at tips via tip connectors 1002(1) and 1002(2), which create a continuous structure, similar to the tip connectors 508(1)-(2).

The first propeller 504 may include a first longitudinal axis 1004 while the second propeller 506 may include a second longitudinal axis 1006. As shown in FIG. 10B, which is a top plan view of the closed propeller apparatus 1000, the first longitudinal axis 1004 may include an angle offset α 1008 such that the second propeller 506 trails the first propeller 504 during rotation of the closed propeller apparatus 1000. However, in some embodiments, the angle offset α 1008 may be configured such that the first propeller 504 trails the second propeller 506 during rotation of the closed propeller apparatus 1000. FIG. 10C is a side elevation view of the closed propeller apparatus 1000. Stated another way, the angle offset α 1008 is an angular difference of the first propeller 504 and the second propeller 506 in a plane of rotation of the propellers. When the angle offset α 1008 is greater than zero, the first longitudinal axis 1004 is not parallel to the second longitudinal axis 1006.

The angle offset α 1008 may cause the second propeller 506 to move thorough laminar or "cleaner" air than would otherwise happen when no angular offset is used (e.g., α=0). The angle offset α 1008 may be any angle up to 90 degrees, however, angles over 45 degrees may be impractical due to constraints in creating long versions of the tip connectors 1002(1)-(2) to span across such a distance and the extra weight and complexity involved with such a design. The angle offset α 1008 may be selected to create optimal thrust from the respective propellers. The use of the angle offset may also be incorporated with any of the other features discussed herein, including use of variable pitch or different propeller blade profiles (or designs), which is discussed immediately below.

FIG. 11A-11C show illustrative closed propeller apparatus 1100. The closed propeller apparatus 1100 includes different propellers blade profiles. FIG. 11A is a perspective view of the closed propeller apparatus 1100. As shown in FIG. 11A, the closed propeller apparatus 1100 may include the first propeller 504 and the second propeller 506 that are connected at tips via tip connectors 1102(1) and 1102(2), which create a continuous structure, similar to the tip connectors 508(1)-(2).

The first propeller 504 may include a first blade profile (or design) 1104 while the second propeller 506 may include a second blade profile (or design) 1106. The blade designs may cause the propeller to move air in a different way, which when properly tuned, may increase thrust generated by the closed propeller apparatus 1100.

FIG. 11B is a top plan view of the closed propeller apparatus 1100, while FIG. 11C is a side elevation view of the closed propeller apparatus 1100. The blade designs for the first propeller 504 and the second propeller 506 may be selected to create optimal thrust from the respective propellers. In some embodiments, the blade profile may include a pitch of the blade, a length of the blade, a length of a pitched portion of the blade, a radius of the blade's leading edge and/or trailing edge, and/or other design factors for propeller blades.

Figure 12:
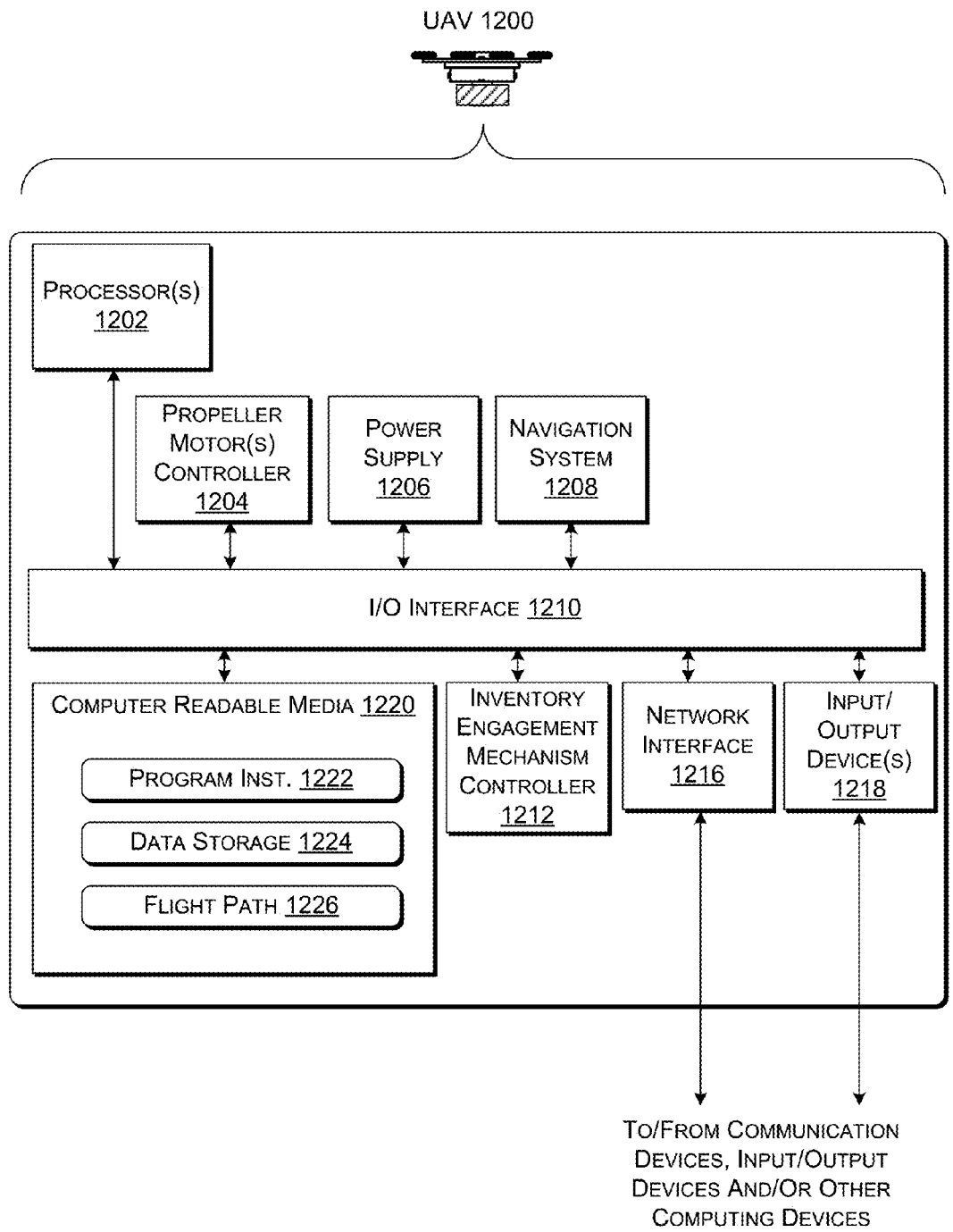
FIG. 12 is a block diagram of an illustrative unmanned aerial vehicle (UAV) 1200.

FIG. 12 is a block diagram of an illustrative unmanned aerial vehicle (UAV) 1200. The UAV 1200 may be used to implement the various systems, devices, and techniques discussed above. In the illustrated implementation, the UAV 1200 includes one or more processors 1202, coupled to a non-transitory computer readable media 1220 via an input/output (I/O) interface 1210. The UAV 1200 may also include a propeller motor controller 1204, power supply module 1206 and/or a navigation system 1208. The UAV 1200 further includes an inventory engagement mechanism controller 1212, a network interface 1216, and one or more input/output devices 1218.

In various implementations, the UAV 1200 may be implemented using a uniprocessor system including one processor 1202, or a multiprocessor system including several processors 1202 (e.g., two, four, eight, or another suitable number). The processor(s) 1202 may be any suitable processor capable of executing instructions. For example, in various implementations, the processor(s) 1202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1202 may commonly, but not necessarily, implement the same ISA.

The non-transitory computer readable media 1220 may be configured to store executable instructions/modules, data, flight paths, and/or data items accessible by the processor(s) 1202. In various implementations, the non-transitory computer readable media 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory as program instructions 1222, data storage 1224 and flight path data 1226, respectively. In other implementations, program instructions, data and/or flight paths may be received, sent or stored upon different types of computer-accessible media, such as non-transitory media, or on similar media separate from the non-transitory computer readable media 1220 or the UAV 1200. Generally speaking, a non-transitory, computer readable memory may include storage media or memory media such as flash memory (e.g., solid state memory), magnetic or optical media (e.g., disk) coupled to the UAV 1200 via the I/O interface 1210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1216.

In one implementation, the I/O interface 1210 may be configured to coordinate I/O traffic between the processor(s) 1202, the non-transitory computer readable media 1220, and any peripheral devices, the network interface or other peripheral interfaces, such as input/output devices 1218. In some implementations, the I/O interface 1210 may perform any necessary protocol, timing or other data transformations to convert data signals from one component (e.g., non-transitory computer readable media 1220) into a format suitable for use by another component (e.g., processor(s) 1202). In some implementations, the I/O interface 1210 may include support for devices attached through various types of peripheral buses, such as a variant of the Peripheral Component Interconnect (PCI) bus standard or the Universal Serial Bus (USB) standard, for example. In some implementations, the function of the I/O interface 1210 may be split into two or more separate components, such as a north bridge and a south bridge, for example. Also, in some implementations, some or all of the functionality of the I/O interface 1210, such as an interface to the non-transitory computer readable media 1220, may be incorporated directly into the processor(s) 1202.

The propeller motor(s) controller 1204 communicates with the navigation system 1208 and adjusts the power of each propeller motor to guide the UAV along a determined flight path. The power supply module 1206 may control the charging and any switching functions associated with one or more power modules (e.g., batteries) of the UAV.

The navigation system 1208 may include a GPS or other similar system that can be used to navigate the UAV to and/or from a location. The inventory engagement mechanism controller 1212 communicates with the actuator(s) or motor(s) (e.g., a servo motor) used to engage and/or disengage inventory. For example, when the UAV is positioned over a level surface at a delivery location, the inventory engagement mechanism controller 1212 may provide an instruction to a motor that controls the inventory engagement mechanism to release the inventory.

The network interface 1216 may be configured to allow data to be exchanged between the UAV 1200, other devices attached to a network, such as other computer systems, and/or with UAV control systems of other UAVs. For example, the network interface 1216 may enable wireless communication between numerous UAVs. In various implementations, the network interface 1216 may support communication via wireless general data networks, such as a Wi-Fi network. For example, the network interface 1216 may support communication via telecommunications networks such as cellular communication networks, satellite networks, and the like.

Input/output devices 1218 may, in some implementations, include image capture devices, infrared sensors, time of flight sensors, accelerometers, lights, speakers, and other input/output devices commonly used in aviation. Multiple input/output devices 1218 may be present and controlled by the UAV 1200. One or more of these sensors may be utilized to assist in landings as well as avoiding obstacles during flight.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV 1200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV 1200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV 1200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV 1200 may be transmitted to the UAV 1200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A redundant propeller drive system comprising:
    a frame;
    a propeller;
    a drive shaft coupled to the propeller, the drive shaft having a first portion located proximate to a first side of the propeller and a second portion located proximate to a second side of the propeller;
    a first motor axially aligned with the drive shaft and coupled to the frame;
    a first one-way clutch bearing that includes a first cylinder coupled to the first portion of the drive shaft and second cylinder coupled to the first motor, the first one-way clutch bearing configured to prevent rotation of the first cylinder in a first direction with respect to the second cylinder to transfer a rotational force from the first motor onto the drive shaft, the first one-way clutch bearing configured to allow rotation of the first cylinder in a second direction with respect to the second cylinder;
    a second motor axially aligned with the drive shaft and coupled to the frame; and
    a second one-way clutch bearing that includes a third cylinder coupled to the second portion of the drive shaft and fourth cylinder coupled to the second motor, the second one-way clutch bearing configured to prevent rotation of the third cylinder in the first direction with respect to the fourth cylinder to transfer a rotational force from the second motor onto the drive shaft, the second one-way clutch bearing configured to allow rotation of the third cylinder in the second direction with respect to the fourth cylinder,
    wherein, in an event of failure of the first motor, the second motor drives the drive shaft while the first one-way clutch bearing allows rotation of the first cylinder in the second direction with respect to the second cylinder, and
    wherein, in an event of failure of the second motor, the first motor drives the drive shaft while the second one-way clutch bearing allows rotation of the third cylinder in the second direction with respect to the fourth cylinder.

2. The redundant propeller drive system as recited in claim 1, wherein the first cylinder is coupled to the first portion proximate to a first end of the drive shaft and the third cylinder is coupled to the second portion proximate to a second end of the drive shaft, and wherein the first cylinder and the third cylinder secure the drive shaft with respect to the frame.

3. The redundant propeller drive system as recited in claim 1, wherein the propeller is a first propeller, and further comprising:
    a second propeller coupled to the drive shaft;
    a first tip connector to couple a first tip of the first propeller to a first tip of the second propeller; and
    a second tip connector to couple a second tip of the first propeller to a second tip of the second propeller.

4. The redundant propeller drive system as recited in claim 1, wherein:
    the first motor is configured to operate up to a threshold number of revolutions per minute to support continuous flight of an aircraft and operate at a first maximum threshold torque that is less than a threshold torque required to support the continuous flight of the aircraft,
    the second motor is configured to operate up to the threshold number of revolutions per minute to support the continuous flight of the aircraft and operate at a second maximum threshold torque that is less than the threshold torque required to support the continuous flight of the aircraft, and the first motor and the second motor, during simultaneous operation, generate a third maximum torque that is greater than the threshold torque required to support the continuous flight of the aircraft.

5. The redundant propeller drive system as recited in claim 1, wherein the propeller is a first propeller, and further comprising:
a second propeller coupled to the drive shaft, and
wherein the first motor, the second motor, or both are located between the first propeller and the second propeller.

6. An apparatus comprising:
a propeller;
a drive shaft coupled to the propeller;
a first one-way clutch bearing to cause rotation of the drive shaft while rotating in a first direction;
a first motor coupled to the drive shaft and to the first one-way clutch bearing; and
a second one-way clutch bearing to cause rotation of the drive shaft while rotating in the first direction;
a second motor coupled to the drive shaft and to the second one-way clutch bearing,
wherein power output from the first motor, the second motor, or both cause rotation of the drive shaft and the propeller, and
wherein the first one-way clutch bearing allows the rotation of the drive shaft in an event of failure of the first motor while the second motor is in operation, and the second one-way clutch bearing allows the rotation of the drive shaft in an event of failure of the second motor while the first motor is in operation.

7. The apparatus as recited in claim 6, wherein the drive shaft includes a first portion that extends outward from a first side of the propeller and a second portion that extends outward from a second side of the propeller, and wherein the first motor is coupled to the first portion of the drive shaft and the second motor is coupled to the second portion of the drive shaft.

8. The apparatus as recited in claim 7, wherein the drive shaft rotates about an axis, the first motor is coupled to the first portion proximate to a first end of the drive shaft and the second motor is coupled to the second portion proximate to a second end of the drive shaft, and the first motor and the second securing the drive shaft along the axis.

9. The apparatus as recited in claim 6, wherein the drive shaft includes a first portion that extends outward from a first side of the propeller, and wherein the first motor and the second motor are coupled to the first portion of the drive shaft.

10. The apparatus as recited in claim 6, wherein:
the drive shaft includes a first portion that extends outward from a first side of the propeller and a second portion that extends outward from a second side of the propeller,
the first one-way clutch bearing is coupled to the first portion proximate to a first end of the drive shaft and the second one-way clutch bearing is coupled to the second portion proximate to a second end of the drive shaft, and
the first one-way clutch bearing and the second one-way clutch bearing securing a location of the drive shaft.

11. The apparatus as recited in claim 6, further comprising:
a first cogwheel coupled to the first motor;
a second cogwheel coupled to the second motor; and
a third cogwheel coupled to the drive shaft,
wherein the first cogwheel and second cogwheel engage the third cogwheel to enable the first motor, the second motor, or both to drive rotation of the drive shaft.

12. The apparatus as recited in claim 11, wherein at least one of the first cogwheel or the second cogwheel has a different number of cogs than the third cogwheel.

13. The apparatus as recited in claim 6, wherein the propeller is a first propeller, and further comprising:
a second propeller coupled to the drive shaft;
a first tip connector to couple a first tip of the first propeller to a first tip of the second propeller; and
a second tip connector to couple a second tip of the first propeller to a second tip of the second propeller.

14. The apparatus as recited in claim 13, wherein the first motor, the second motor, or both are located between the first propeller and the second propeller.

15. An unmanned aerial vehicle (UAV) comprising:
a frame;
a power source coupled to the frame; and
a plurality of propulsion units coupled to the frame and connected to the power source, wherein at least one propulsion unit of the plurality of propulsion units includes:
a propeller;
a drive shaft coupled to the propeller;
a first motor coupled to the frame and coupled to the drive shaft via a first one-way clutch bearing; and
a second motor coupled to the frame and coupled to the drive shaft via a second one-way clutch bearing, the first one-way clutch bearing enabling rotation of the drive shaft in an event of failure of the first motor while the second motor is in operation, and the second one-way clutch bearing enabling rotation of the drive shaft in an event of failure of the second motor while the first motor is in operation.

16. The UAV as recited in claim 15, wherein the drive shaft includes a first portion that extends outward from a first side of the propeller and a second portion that extends outward from a second side of the propeller, the first one-way clutch bearing is coupled to the first portion proximate to a first end of the drive shaft and the second one-way clutch bearing is coupled to the second portion proximate to a second end of the drive shaft, and the first one-way clutch bearing and the second one-way clutch bearing securing a location of the drive shaft with respect to the frame.

17. The UAV as recited in claim 15, wherein the drive shaft includes a first portion that extends outward from a first side of the propeller, and wherein the first motor and the second motor are coupled to the first portion of the drive shaft.

18. The UAV as recited in claim 15, wherein the propeller is a first propeller, and further comprising a second propeller coupled to the drive shaft.

19. The UAV as recited in claim 18, wherein the first propeller is coupled to the second propeller by tip connectors that extend between adjacent tips of the first propeller and the second propeller.

20. The UAV as recited in claim 15, wherein the propeller is a first propeller, and further comprising:
a second propeller coupled to the drive shaft, and
wherein the first motor, the second motor, or both are located between the first propeller and the second propeller.

* * * * *